April 29, 1930.   A. W. WISNER   1,756,111
PHOTOGRAPHIC COPYING APPARATUS
Filed Dec. 5, 1923   2 Sheets-Sheet 1

Inventor
Adrian W. Wisner

Attorney

April 29, 1930.  A. W. WISNER  1,756,111
PHOTOGRAPHIC COPYING APPARATUS
Filed Dec. 5, 1923  2 Sheets-Sheet 2
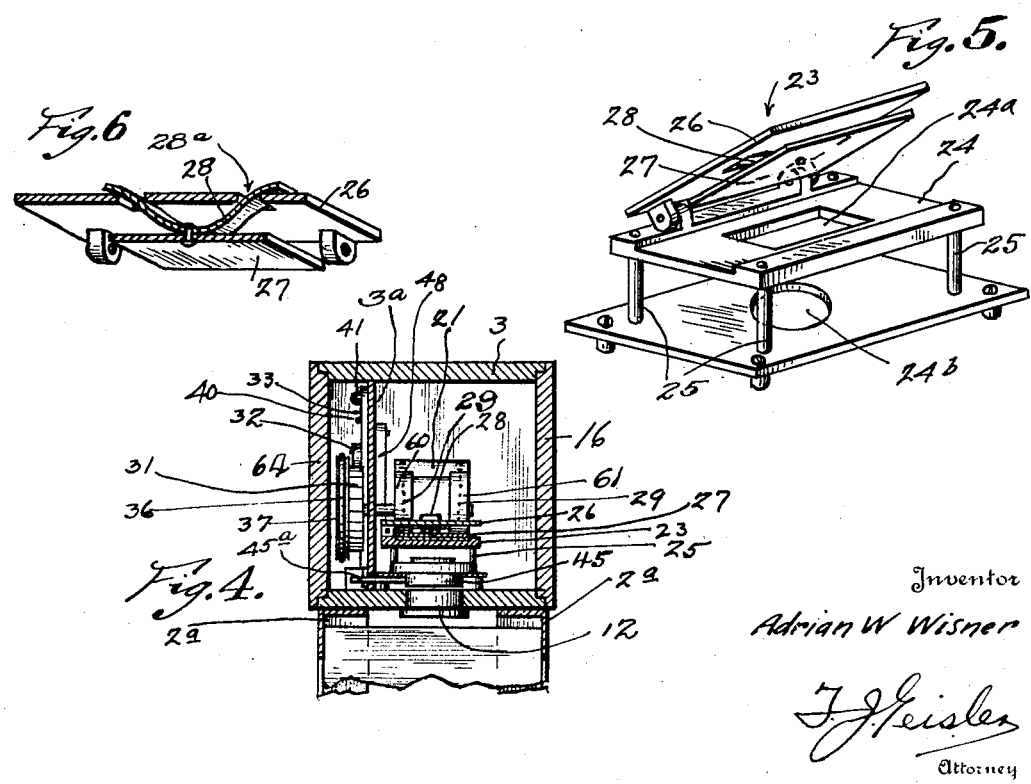

Patented Apr. 29, 1930

1,756,111

UNITED STATES PATENT OFFICE

ADRIAN W. WISNER, OF TACOMA, WASHINGTON

PHOTOGRAPHIC-COPYING APPARATUS

Application filed December 5, 1923. Serial No. 678,641.

The object of my invention is to provide a convenient and compact portable apparatus for reproducing photographically such objects as written and printed matter, records, letters, maps, drawings and the like, and especially an apparatus adapted to project the image on a sensitized film-ribbon.

A further object of my invention is to provide simple means preferably electrically operated, for moving predetermined lengths of film successively across the shutter of the light projecting element, of the apparatus.

A further object of my invention is to provide simple means whereby a number of photographic copies of any printed matter, or the like may be taken, successively, by the operating of an electric switch located on the exterior of the housing containing the film moving devices, and thus conveniently accessible to the operator.

A still further object is to provide a photographic copying apparatus adaptable, with only a slight adjustment, for printing positive copies of any matter from the negative film.

I attain these objects of my invention in a photographic copying apparatus comprising a housing containing rolls for carrying and winding the film, and means for holding for exposure over the shutter of the camera lens, a section of the film, and means for moving sections of predetermined length of film successively through said film-holding means, including an operative connection from the film pulling roller to the said film winding roll, and a ratchet wheel carried by the shaft of said film pulling roller provided with a lever fulcrumed adjacent said ratchet wheel and carrying a pawl engaging the latter, and actuated by a solenoid connected to said operating lever and a switch located on the exterior of said housing in the electric circuit of said solenoid.

The foregoing and incidental features of my invention are hereinafter fully described with reference to the accompanying drawings, in which:

Fig. 4 shows a transverse section taken through Figure 1, and illustrates further details of construction;

Fig. 5 shows a perspective view of the film-guide of my invention;

Fig. 6 shows a perspective view of the film-guide, similar to Fig. 5 illustrating further details of construction.

Figures 1, 2, 3:
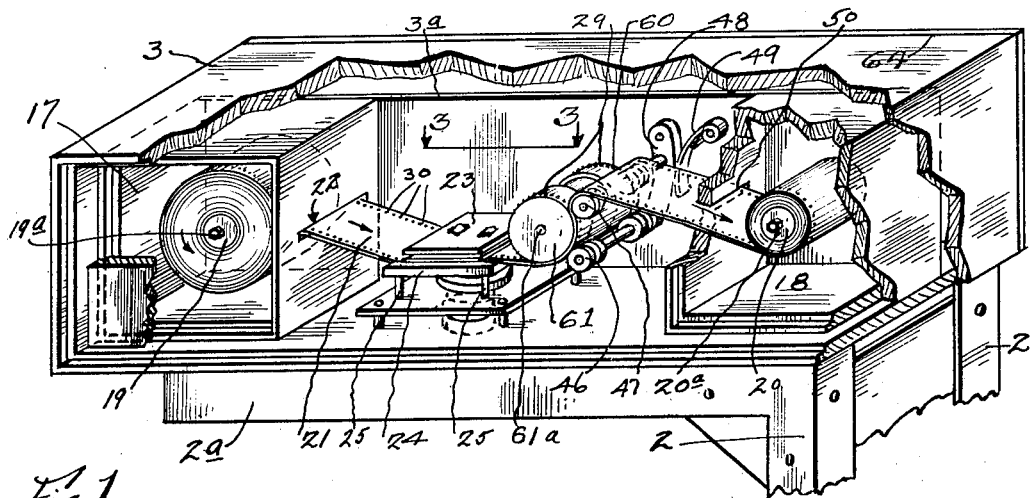
Fig. 1 shows a perspective view of my photographic apparatus with a portion of the housing broken away to disclose the mechanism contained therein.
Fig. 2 shows a perspective view similar to Fig. 1 except taken from the opposite side of the housing and discloses the electromagnetic means for operating the film.
Fig. 3 shows a fragmentary plan view taken on the line 3—3 of Fig. 1, illustrating diagrammatically the shutter of the camera and the lever for operating the latter.

My photographic apparatus comprises a housing 3 mounted in any convenient manner over a table on which the matter to be photographed may be suitably arranged and held in place.

The housing 3 is light proof, its opposite lateral sides 16 and 64 are removable and a vertical longitudinal partition $3^a$ is provided arranged adjacent the side 64.

The larger of the two chambers provided by the said partition houses the film and film exposing means. Inner chambers 17 and 18 are provided at each end of said larger chamber, the first enclosing a spool 19 mounted on a shaft $19^a$, the shaft being supported on the partition $3^a$, the latter inner chamber 18 encloses a similar spool 20 mounted on a shaft $20^a$ which is also supported by the partition $3^a$, and extends through the partition into the smaller longitudinal chamber.

A film 21 wound on the spool 19 passes through a slot 22 in the chamber 17 and through a film tensioning and guiding device 23, Fig. 5, which is spaced above an aperture $24^b$ by supports 25, and comprises a horizontal section mortised as at 24 to receive the film, and provided with an aperture $24^a$ in alinement with the aperture $24^b$ located over a lens 12 seated in the floor of the housing 3.

The film tensioning and guiding device 23, Fig. 6 comprises a square section 26 hinged at its sides to a film guiding means and provided with a plate 27 attached thereto by a flat spring 28, fixed at its center to the plate 27 and the two ends of the spring extend through slots 28ª in the section 26, so as to make the plate 27 more or less adjustable to any pressure thereon.

The film tensioning device 23 when in an operative position lies over the film guiding means and the spring mounted plate 27 bears against the film by the weight of the section 26, thus holding the film securely against the aperture 24ª.

The lens 12 in the floor of the housing is arranged in accurate alinement with the apertures 24ª, 24ᵇ and the film framed by the said aperture. The lens is provided with a suitable shutter 45 and an operating lever 45ª for said shutter extending through a slot in the partition 3ª into the said smaller longitudinal chamber.

A shaft 61ª is supported by and extending through the partition adjacent to the film guide is provided with two rollers 60 and 61 spaced apart so that pins 29 arranged on the peripheries of the rollers engage perforations 30 provided in the usual manner on edges of the film ribbon 21.

Idling rollers 46 and 47 are mounted on shafts fixed to an arm 48 supported by the partition 3ª and are adapted to bear against the under side of the film ribbon to hold the ribbon firmly against the rollers 60 and 61 by a flat spring 49 which bears against the arm 48 and holds the said rollers in position.

The film ribbon then passes through a slot 50 into the inner chamber 18 and onto the spool 20.

The actuating means for moving and exposing the film are provided in the smaller of the longitudinal chambers. Upon the extremity of the shaft 20ª, on the other end of which is mounted the film winding spool 20, is provided a sheave 35, and on the shaft 61ª on the other end of which is fixed the rollers 60 and 61 is provided a toothed disc 31 and a sheave 37, the latter connected by a belt 36 to the said sheave 35.

An operating arm 33 is pivoted as at 34, and a coil spring 41 is anchored at 41ª to the side of the partition 3ª and the other end is fixed to the upper extremity of the operating arm 33 as is also a rod 40 which is connected to the plunger 39 of a solenoid 38. The upper portion of the arm 33 bears against a stop 33ᵇ which is an eccentric disc adapted to be manually rotated and thus limiting the arm 33 in its movement and the amount of film to be moved at each rotation, and a pawl 32 is fixed to the arm 33 to engage the teeth on the disc 31. The lower end of the operating arm bears against a sliding lever 44, which in turn bears against the lever 45ª, which actuates the shutter 45.

A switch 43 shown digrammatically is provided in the electrical circuit connecting the solenoid and the source of power 42, as for instance a storage battery.

The operation of my device is as follows:

The lateral side 16 of the housing 3 is removed and the spool 19 loaded with film is mounted on the shaft 19ª, and the film ribbon is threaded through the slot 22 into the film guide 24 and under the film tensioning device 23.

The film is then inserted under the film moving rollers 60 and 61 and between the idling rollers 46 and 47 so that the pins 29 will engage the perforations 30 in the edges of the film ribbon, after which the film is threaded through the slot 50 into the inner chamber 18 and onto the film winding spool 20.

After the camera is loaded the side 16 is replaced, and the switch 43 provided for actuating the solenoid, which may be located at any convenient place on the outside of the camera, is closed, and the solenoid actuated to withdraw the rod 40 and move the operating arm 33 forward against the tension of the spring 41.

The pawl 32 during this movement will engage the toothed disc 31 and rotate the shaft 61ª, on the other end of which are mounted the film moving rollers 60 and 61. At the same time by means of the belt 36 over the sheaves 37 and 35, the latter being mounted on a shaft 20ª on the other end of which is mounted the film winding spool 20, will be simultaneously rotated so as to wind the film as it is moved forward by the rollers 60 and 61.

When the solenoid is released, the spring 41 will return the operating arm 33 to its former position, which is limited in its movement by the eccentric stop 33ᵇ, and thus the amount of film moved during each operation may be adjusted, and the lower end 33ª of the lever 33 will move toward the sliding lever 44, which will actuate lever 45ª of the shutter 45, to open and close the shutter 45, whereby an exposure of the section of the film before the lens will have been made.

Thus when a photograph is to be taken, it is only necessary to close the switch 43 and a fresh section of film will be moved before the lens by the rollers 60 and 61 and the film winding spool 20 actuated by the arm 33 and the pawl 32, and the arm 33 will operate the shutter and the object in the table will have been photographed efficiently, quickly, and cheaply, and my photographic copying apparatus will be ready for the next operation without further adjustment, which operation may be repeated until the film ribbon is entirely used.

I claim:

1. A photographic copying apparatus of the character described, comprising a housing provided with a lens and shutter therefor said housing containing rolls for carrying and winding the film, and means for holding, for exposure over the shutter of the camera-lens, a section of the film, means for moving sections of predetermined length of film successively through said film-holding means, said film-moving means comprising a film-pulling roller, an operative connection from the film-pulling roller to the said film-winding roll, a ratchet-wheel carried by the shaft of said film-pulling roller, a lever-fulcrumed adjacent said ratchet-wheel and carrying a pawl engaging with the latter, and an operative connection between said lever and said shutter.

2. A photographic copying apparatus of the character described, comprising a housing provided with a lens and shutter therefor, said housing containing rolls for carrying and winding the film, and means for holding, for exposure over the shutter of the camera-lens, a section of the film, means for moving sections of predetermined length of film successively through said film-holding means, said film-moving means comprising a film-pulling roller, an operative connection from the film-pulling roller to the said film-winding roll, a ratchet-wheel carried by the shaft of said film-pulling roller, a lever-fulcrumed adjacent said ratchet-wheel and carrying a pawl engaging with the latter, a stop limiting the movement of said lever, said stop comprising an eccentric disc adjacent the said lever, and an operative connection between said lever and said shutter.

3. A photographic copying apparatus of the character described, comprising a housing provided with a lens and shutter therefor, said housing containing rolls for carrying and winding the film, and means for holding, for exposure over the shutter of the camera-lens, a section of the film, means for moving sections of predetermined length of film successively through said film-holding means, said film moving means comprising a film-pulling roller, an operative connection from the film-pulling roller to the said film-winding roll, a ratchet-wheel carried by the shaft of said film-pulling roller, a lever fulcrumed adjacent said ratchet-wheel and carrying a pawl engaging with the latter, and a sliding bar operatively connecting said lever with said shutter.

4. A photographic copying apparatus of the character described, comprising a housing provided with a lens and shutter therefor, said housing containing rolls for carrying and winding the film, and means for holding, for exposure over the shutter of the camera-lens, a section of the film, means for moving sections of predetermined length of film successively through said film-holding means, said film-moving means comprising a film-pulling roller, an operative connection from the film-pulling roller to the said film-winding roll, a ratchet-wheel carried by the shaft of said film-pulling roller, a lever-fulcrumed adjacent said ratchet-wheel and carrying a pawl engaging with the latter, a stop limiting the movement of said lever, said stop comprising an eccentric disc adjacent the said lever, and a sliding bar operatively connecting said lever with said shutter.

5. A photographic copying apparatus of the character described, comprising a housing provided with a lens and shutter therefor, said housing containing rolls for carrying and winding the film, and means for holding, for exposure over the shutter of the camera-lens, a section of the film, means for moving sections of predetermined length of film successively through said film-holding means, said film moving means comprising a film-pulling roller, an operative connection from the film-pulling roller to the said film-winding roll, a ratchet-wheel carried by the shaft of said film-pulling roller, a lever fulcrumed adjacent said ratchet-wheel and carrying a pawl engaging with the latter, an operative connection between said lever and said shutter, and a solenoid connected to and operating said lever and a switch, located on the exterior of said housing, in the electric circuit of said solenoid.

6. A photographic copying apparatus of the character described comprising a housing provided with a lens and shutter therefor, said housing containing rolls for carrying and winding the film, and means for holding, for exposure over the shutter of the camera-lens, a section of the film, means for moving sections of predetermined length of film successively through said film-holding means, said film-moving means comprising a film-pulling roller, an operative connection from the film-pulling roller to the said film-winding roll, a ratchet-wheel carried by the shaft of said film-pulling roller, a lever-fulcrumed adjacent said ratchet-wheel and carrying a pawl engaging with the latter, a stop limiting the movement of said lever, said stop comprising an eccentric disc adjacent the said lever, an operative connection between said lever and said shutter, and a solenoid connected to and operating said lever and a switch, located on the exterior of said housing, in the electric circuit of said solenoid.

7. In a photographic copying apparatus of the character described, film-moving means comprising a film-pulling roller, a rachet-wheel carried by the shaft of said film-pulling roller, a lever-fulcrumed adjacent said rachet-wheel and carrying a pawl engaging with the latter, an operative connection between said lever and said shutter, comprising a sliding bar operatively connecting said lever with said shutter, and a solenoid connected to and operating said lever and a switch, located on the exterior of said housing, in the electric circuit of said solenoid.

8. In a photographic copying apparatus of the character described, film-moving means comprising a film-pulling roller, a rachet-wheel carried by the shaft of said film-pulling roller, a lever-fulcrumed adjacent said rachet-wheel and carrying a pawl engaging with the latter, a stop limiting the movement of said lever, said stop comprising an eccentric disc adjacent the said lever, an operative connection between said lever and said shutter, comprising a sliding bar operatively connecting said lever with said shutter, and a solenoid connected to and operating said lever and a switch, located on the exterior of said housing, in the electric circuit of said solenoid.

9. A photographic copying apparatus of the character described, comprising a housing provided with a lens and shutter therefor, said housing containing rolls for carrying and winding the film, and means for holding, for exposure over the shutter of the camera lens, a section of the film, means for moving sections of predetermined length of film successively through said film-holding means, said film-moving means comprising a film-pulling roller, an operative connection from the film-pulling roller to the said film-winding roll, a rachet-wheel carried by the shaft of said film-pulling roller, a lever fulcrumed adjacent said rachet-wheel and carrying a pawl engaging with the latter, means for limiting the movement of said lever, and an operative connection between said lever and said shutter.

ADRIAN W. WISNER.